United States Patent [19]

Boczar

[11] Patent Number: 5,028,816
[45] Date of Patent: Jul. 2, 1991

[54] ELECTRO-OPTIC LINE NARROWING OF OPTICAL PARAMETRIC OSCILLATORS

[75] Inventor: Bruce P. Boczar, Trevose, Pa.

[73] Assignee: The United States of America as represented by the Secretary of the Navy, Washington, Del.

[21] Appl. No.: 527,966

[22] Filed: May 21, 1990

[51] Int. Cl.$^5$ .............................................. H03F 7/00
[52] U.S. Cl. ................................... 307/428; 307/425; 372/21; 372/25
[58] Field of Search ................. 307/428, 425; 372/21, 372/19, 20, 25; 350/355, 356

[56] References Cited

U.S. PATENT DOCUMENTS

| | | | |
|---|---|---|---|
| 3,414,839 | 12/1968 | Bridges et al. | 372/21 |
| 3,487,329 | 12/1969 | Wen | 372/19 |
| 4,180,751 | 12/1979 | Ammann | 307/428 |
| 4,639,923 | 1/1987 | Tang et al. | 372/21 |
| 4,880,996 | 11/1989 | Peterson et al. | 372/21 |

Primary Examiner—Frank Gonzalez
Assistant Examiner—Susan S. Morse
Attorney, Agent, or Firm—James V. Tura; James B. Bechtel; Susan E. Verona

[57] ABSTRACT

In the present invention a nonlinear crystal of an optical parametric oscillator is provided with a pump pulse and electrodes for applying a high voltage to the crystal during the pump pulse. The high voltage is switched from one level to another during the pump pulse duration. The initial value of the high voltage determines the position of the frequency center of the optical parametric oscillator gain profile because the indices of refraction are a function of the applied voltage due to the electro-optic effect. During the pump pulse, when the high voltage is switched to some other value, a new set of momentum and energy conservation conditions results. This causes a frequency shift in the gain profile. Thus the oscillator is provided with two differing gain profiles during the pump pulse. The output frequency of the oscillator is only those frequencies in both gain profiles.

18 Claims, 2 Drawing Sheets

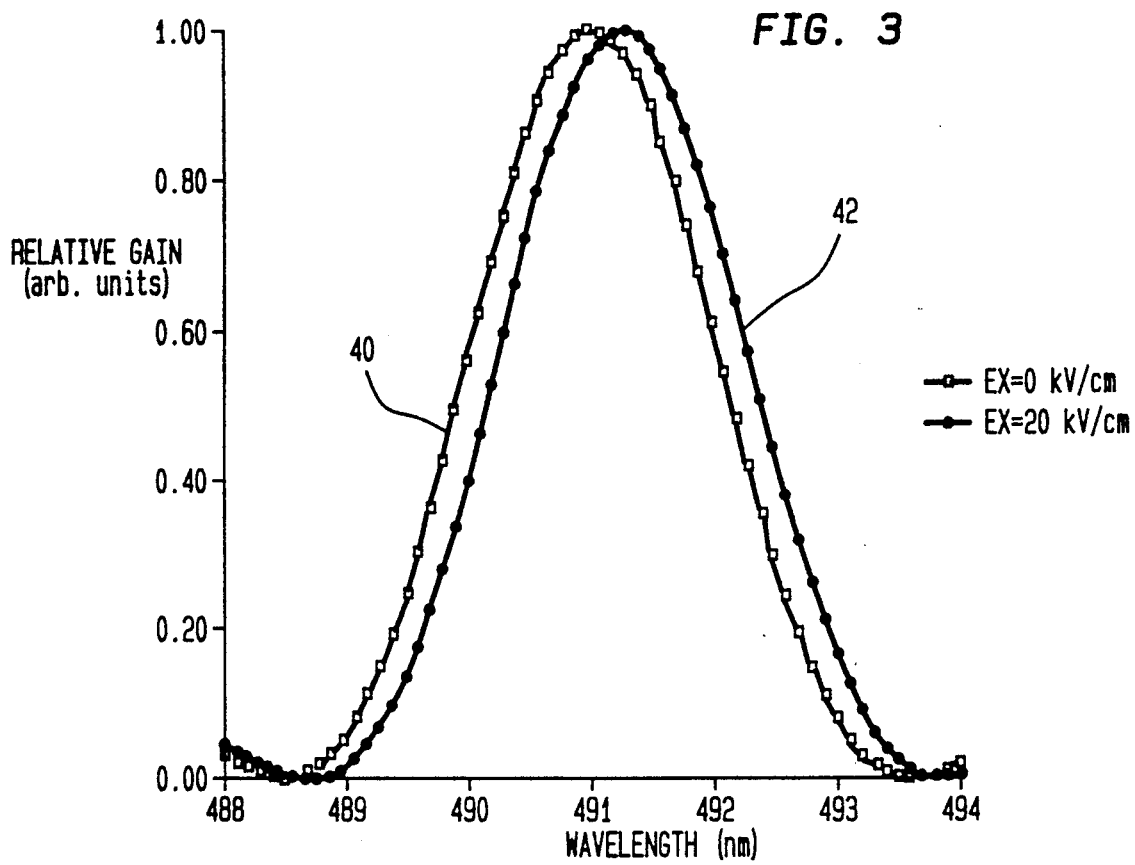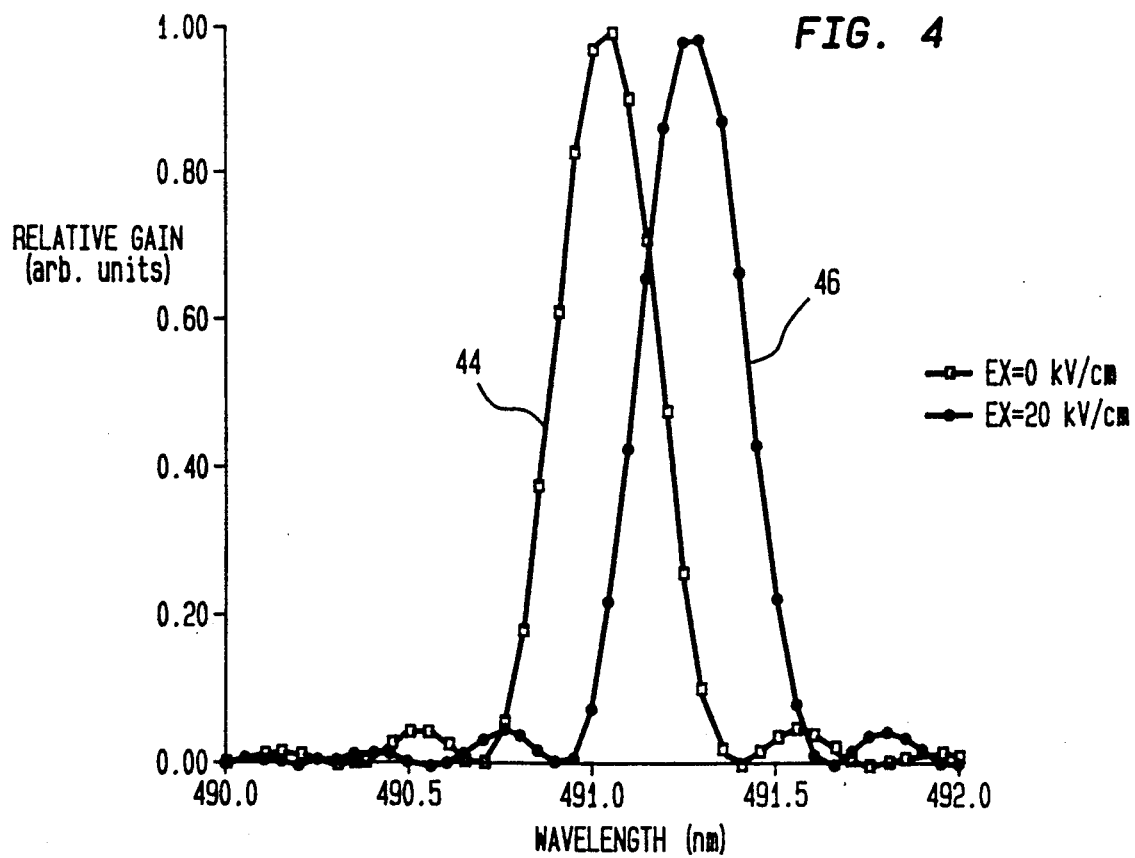

ELECTRO-OPTIC LINE NARROWING OF OPTICAL PARAMETRIC OSCILLATORS

STATEMENT OF GOVERNMENT INTEREST

The invention described herein may be manufactured and used by or for the Government of United States of America for governmental purposes without the payment of any royalties thereon or therefore.

BACKGROUND OF THE INVENTION

This invention relates to the field of optical parametric oscillators and in particular to the control of the output spectral linewidth and line center of laser pumped optical parametric oscillators.

The optical parametric oscillator, which consists of a nonlinear gain medium inserted into a resonator cavity, provides a convenient method for generating widely tunable radiation from a single device. Recent material developments such as beta barium borate and urea have brought about new interest in optical parametric oscillators, especially in the visible region of the spectrum.

The output frequency bandwidth of an optical parametric oscillator is dependent on the spectral linewidth and angular divergence of the pump laser. This is due to the fact that the output frequencies are determined by energy and momentum conservation wherein the frequency of the pump must equal the sum of the signal and idler frequencies. Additionally, this is due to the fact that the extraordinary index of refraction in birefringement crystals is a function of the angle of incidence and that all the indices vary with wavelength.

Many applications, such as submarine laser communications, require a narrowband source, much narrower in fact, than is routinely available from a conventional optical parametric oscillator. Traditionally, line narrowing has been achieved by insertion of frequency dispersive elements into the cavity. Single mode operation has been achieved by using a grating, beam expander and an etalon within the resonator cavity. Unfortunately, however, narrowline operation is often accompanied by a decrease in efficiency and output energy due to the fact that the intracavity dispersive elements possess optical loss and their finite physical size increases the resonator length, both of which raise the oscillation threshold.

SUMMARY OF THE INVENTION

A system for electro-optically line narrowing the output of an optical parametric oscillator involves establishing the initial momentum and energy conservation conditions necessary for oscillation by applying an electric field to a nonlinear crystal in addition to setting the phase matching and azimuthal angles. During the pumping pulse, the momentum and energy conditions are changed by changing the value of the applied field, and hence the indices of refraction. This shifts the spectral gain center of the crystal, as the phase matching and azimuthal angles are held constant. The output frequencies are then restricted to the frequencies that are common to both the initial and final gain profiles.

In this method lossy intracavity elements are eliminated and the resonator length can be minimized, which maximizes the number of cavity roundtrips for a given pump pulse duration. These factors serve to keep the oscillation threshold low. Since there is radiant flux in the resonator cavity during the pumping period following the spectral gain shift, the system is essentially injection locked, which also serves to minimize the oscillation threshold for frequencies that are common to both the initial and final gain profiles.

BRIEF DESCRIPTION OF DRAWINGS

The objects, advantages and novel features of the invention will become apparent from the following detailed description of the invention when considered in conjunction with the accompanying drawings wherein:

FIG. 3 shows calculated gain profiles of the electro-optically line narrowed optical parametric oscillator of FIG. 1 before and after the voltage applied to the crystal is changed for a single pass case.

FIG. 4 shows calculated gain profiles of the electro-optically line narrowed optical parametric oscillator of FIG. 1 before and after the voltage applied to the crystal is changed for a multiple pass case.

DETAILED DESCRIPTION OF THE INVENTION

Figure 1:
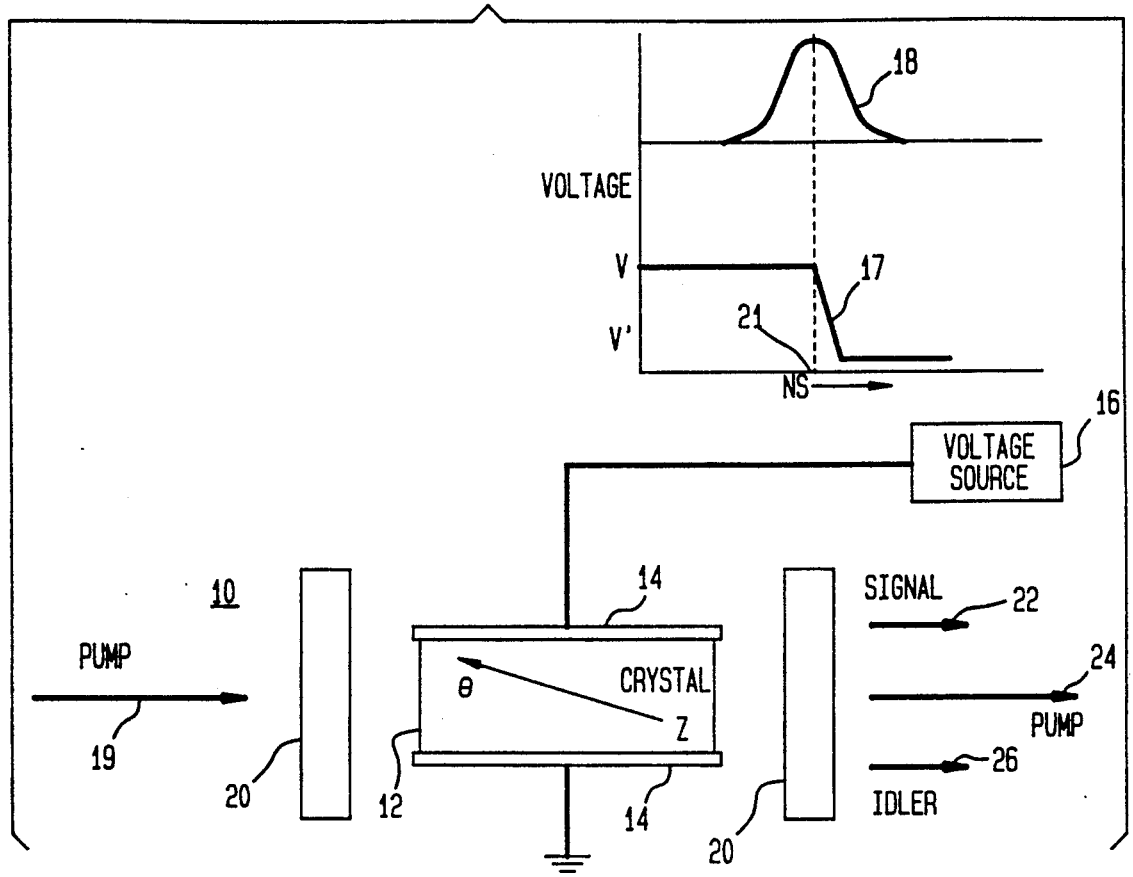
FIG. 1 shows a block diagram representation of the electro-optically line narrowed optical parametric oscillator of the present invention.

Referring now to FIG. 1, there is shown electro-optically line narrowed optical parametric oscillator 10 of the present invention. Electro-optically line narrowed optical parametric oscillator 10 of the present invention includes resonator 20 and nonlinear crystal 12 having electrodes 14 for applying a high voltage level to nonlinear crystal 12. The high voltage level V, provided by high voltage source 16, is switched during the duration of pump pulse 18 to a different voltage level V'.

Pump pulse 18 is applied as indicated by arrow 19. Depleted pump pulse 19 exits oscillator 10 as indicated by arrow 24. In addition to setting the phase matching angle $\theta$, the initial value V of the high voltage applied by high voltage source 16 to nonlinear crystal 12 by way of electrodes 14 determines the position of the frequency center of the gain profile of optical parametric oscillator 10 because the indices of refraction of nonlinear crystal 12 are a function of the incident angle with respect to crystal optic axis Z and also a function of applied voltage in accordance with the electro-optic effect. It will be understood by those skilled in the art that the phase matching angle $\theta$ is a function of both pump pulse direction 19 and crystal optic axis Z.

During the duration of pump pulse 18, the high voltage applied to nonlinear crystal 12 by way of electrodes 14 is switched by high voltage source 16 to some other value. This change in the output level of high voltage source 16 results in a new set of momentum and energy conservation conditions and therefore, a frequency shift in the gain profile of electro-optically line narrowed optical parametric oscillator 10. Optical parametric oscillator 10 is thus essentially self-injection seeded and the output of oscillator system 10 is a function of the frequencies which are common to both the gain profile prior to the shift in the high voltage applied to nonlinear crystal 12 and gain profile after the switch. The method of the present invention thus eliminates the need for lossy elements (not shown) in optical parametric oscillator resonators which increase the oscillation threshold. Additionally, this method minimizes the resonator length. Minimized resonator length in turn minimizes the oscillation threshold.

Efficient frequency conversion in nonlinear crystals such as nonlinear crystal 12 depends on establishing and maintaining the phase matching conditions over an appreciable crystal 12 interaction length. In the case of optical parametric oscillator 10, the phase matching condition is given by:

$$\omega_{pump} = \omega_{signal} + \omega_{idler} \quad (1)$$

$$k_{pump} = k_{signal} + k_{idler}$$

where $k = n\omega/c$. Equations (1) determine which frequencies of the spontaneous parametric fluorescence will oscillate. Equations (1) also provide for a convenient tuning mechanism through the variation of the indices of refraction with incident angle, temperature, and applied electric field.

To illustrate the momentum and energy conservation conditions prior to time 21, conditions may be represented by the following:

$$\omega_P = \omega_S + \omega_I \quad (2)$$

$$k_P = k_S + k_I$$

$$k = n\omega/c$$

The conditions after time 21 may be represented as follows:

$$\omega'_P = \omega'_S + \omega'_I \quad (3)$$

$$k'_P = k'_S + k'_I$$

$$k' = n'\omega'/c$$

Pump pulse 18 may have a time duration of, for example, ten nanoseconds. Time 21 at which waveform 17 ramps downwards indicating a change in the voltage output level of voltage source 16 from level V, may coincide with the approximate center point of pump pulse 18. The duration of the time period between time 21 and the time at which the output of voltage source 16 reaches its new level V' is preferably less than approximately three nanoseconds for a pump pulse 18 having a duration of ten seconds. The duration of the ramp must be less than the duration of pulse 18. However, the voltage level of voltage source 16 may be switched three, six, or even nine nanoseconds into pump pulse 18, as long as the switching does not occur before or after pump pulse 18. The new level V' of waveform 17 may be negative, positive, a value greater than V or less than V as long as it is different from the initial value at time 21. A nonlinear crystal 12 having a bigger electro-optic effect, may require a lower voltage level to achieve these results. It will be understood by those skilled in the art that nonlinear crystal 12 within oscillator 10 may be replaced by a medium or material other than a crystal having the electro-optic and nonlinear properties required for oscillator 10. Additionally, it will be understood that signal 22 may be in the visible range, the ultraviolet range, or the infrared range.

Figure 2A:
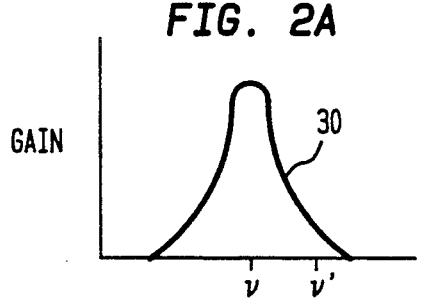
FIGS. 2A, B show representative gain profiles of the electro-optically line narrowed optical parametric oscillator of FIG. 1 before (centered at $v$) and after the voltage applied to the crystal is changed (centered at $v'$).
Figure 2B:
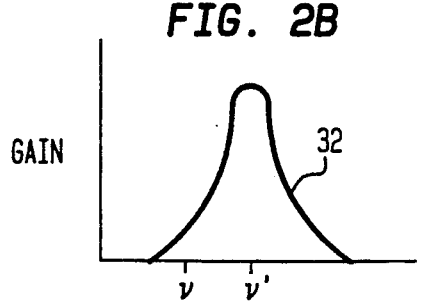

Referring now to FIGS. 2A, B, there are shown gain profiles files 30, 32. Gain profile 30, corresponding to Equations (2), is peaked at frequency $\nu$. Gain profile 32, peaked at $\nu'$, corresponding to Equations (3) wherein the voltage output level of high voltage source 16 has been changed during the duration of pump pulse 18, is shifted.

To model the effect of electro-optically narrowing the optical parametric oscillator linewidth, the detuning parameter, $\text{sinc}^2(\Delta k \frac{l}{2})$, was evaluated from calculated of refraction, the result of which gives the spectral gain profile due to the crystal dispersion. A perfectly phase matched system ($\Delta k(T) = \Delta k(\theta) = 0$) with respect to thermal and angular detuning was assumed.

As an example, a KD*P (Type II) optical parametric oscillator pumped by 354.7 nanometer radiation was modeled. The indices of refraction were calculated from a modified Sellmeier equation of the form:

$$n^2 A + [CB/C\lambda^2 - 1] + [D\lambda^2/(E\lambda^2 - 1)] \quad (4)$$

The Sellmeier constants, along with the other system parameters are listed in Table 1.

The detuning parameter was evaluated both in the absence and in the presence of an applied electric field. The indices of refraction of KD*P oriented for a Type II interaction under the influence of a suitably applied electric field (with no component in the propagation direction) are given by:

$$n_o = n_o$$

$$n_e(E) = n_e - n_e^3 \cos\theta \sin\theta \, r_{41} E \quad (5)$$

Referring now to FIG. 3, there is shown the calculated spectral gain profile for a single pass through a one centimeter long nonlinear crystal 12. For an electric field strength of twenty kilovolts per centimeter provided by high voltage source 16, gain profile 42 is centered at 491.25 nanometers for the parameters of Table 1. After the field provided by high voltage source is switched to zero kilovolts per centimeter, gain profile 40 is centered at 491.0 nanometers. Both profiles have a FWHM of 2.25 nanometers.

Thus, for a single crystal pass not many frequencies would be eliminated, due to the width of the gain curve. For p cavity roundtrips, however, the optical parametric oscillator gain bandwidth is reduced to:

$$\Delta \nu(p) = (1/\ p) \Delta \theta(1)$$

Referring now to FIG. 4, there is shown results for the example of a three centimeter resonator length and a ten nanosecond pump pulse 18 duration. The center of gain profiles 44, 46 remain the same as in the single pass case for gain profiles 40, 42. However, the FWHM is reduced by a factor of seven to approximately three-tenths of a nanometer.

The output bandwidth of optical parametric oscillator 10 is then restricted to frequencies that are phase matched both before and after the gain profile is switched. Frequencies that are phase matched only under the initial momentum conditions will not be in phase with the pump radiation and will not experience gain under the final momentum conditions. Conversely, frequencies that are phase matched only under the final momentum conditions experience a reduced number of pump pulse roundtrips and may never reach oscillation threshold. In the example, the FWHM of the "overlap region" is reduced an additional two to three times over the normal case of no applied field.

The method of the present invention may be used on all types and classes of nonlinear crystals 12 which are conventionally used in optical parametric oscillators such as electro-optically line narrowed optical parametric oscillator 10 provided that nonlinear crystal 12 exhibits the electro-optic effect. Different magnitudes and polarities of voltages may be applied to each electrode and switched independently to optimize line narrowing. Electrodes 14 may be evaporated gold chrome, conductive copper tape, or any other suitable conductive material. Electrode 14 configuration may vary depending on the class of crystal 12 used (in relationship to the crystalline axes) and the type of phase matching used in order to maximize the effect.

Thus electro-optically line narrowed optical parametric oscillator system 10 provides a low loss method by which the spectral output linewidth of an optical parametric oscillator may be reduced. The calculations set forth herein indicate that a linewidth reduction of several times may be realized with reasonable field strengths. The design of system 10 depends upon many factors, including the phase matching scheme, the crystal class, the crystal spectral acceptance, the orientation of the applied electric field, the magnitude and sign of the electro-optic coefficients, and the dielectric breakdown of the nonlinear material.

Thus, optical parametric oscillator 10 is provided with a laser pump pulse 18 of nanosecond or greater duration and resonator 20 of optical parametric oscillator 10 is configured as short as possible. This maximizes the number of passes through nonlinear medium 12 on which circulating signal 22 or idler wave 26 experiences gain, when pump pulse 18 is also present in nonlinear medium 12. For example, a ten nanosecond pump pulse 18 is approximately three hundred centimeters long, calculated from the speed of light in air, signal 22 or idler 26 experiences gain on fifty passes through nonlinear medium 12 if it is used in a three centimeter long optical parametric oscillator resonator.

In an alternate embodiment, optical parametric oscillator 10 is pumped by a laser that is mode-locked. The output of a mode-locked laser is typically in the form of pulse trains comprised of individual sub-nanosecond pulses separated by the pump laser cavity roundtrip time, typically ten nanoseconds. In this case, the optical parametric oscillator resonator is lengthened to match the pump laser cavity length. In this way, the circulating radiation inside optical parametric oscillator 10 created by pump pulse n of the pulse train rearrives in the nonlinear medium synchronously with pump pulse n plus one of the train and experiences gain. Thus, this method is referred to as synchronous pumping. After a sufficient number of pulses, optical parametric oscillator 10 is above threshold and oscillates.

The method of electro-optic line narrowing optical parametric oscillator 10 output can be employed in the case of synchronous pumping by, as in the case of single pump pulse 18, switching the high voltage and hence the gain conditions before optical parametric oscillator 10 has reached oscillation threshold. In the case of synchronous pumping or pulsing, this occurs sometime during the pulse train, as opposed to sometime during the single nanosecond or greater pump pulse 18 of the previous case. As before, the output frequencies are restricted to frequencies that are common to the initial and final gain profiles established by the phase matching angle, azimuthal angle, temperature, and the levels of high voltage chosen.

Many modifications and variations of the present invention are possible in view of the above disclosure. It is therefore to be understood, that within the scope of the appended claims, the invention may be practiced otherwise than as specifically described.

TABLE 1

| PARAMETERS USED FOR CALCULATIONS | |
|---|---|
| Nonlinear Material | KD*P @ 33° C. |
| Phase Matching Angle | 53° |
| Phase Matching Scheme | Type II |
| Pump Wavelength | 354.7 nm |
| Signal Wavelengths | 489–491 nm |
| Idler Wavelengths | 1291–1277 nm |
| $r_{41}$ | $8.8 \times 10^{-10}$ cm/V |
| Crystal Length | 1 cm |
| Resonator Length | 3 cm |
| Pump Pulse Duration | 10 ns |

| | Sellmeier Constants: | | | | |
|---|---|---|---|---|---|
| | A | $B(\times 10^{-10})$ | $C(\times 10^9)$ | $D(\times 10^5)$ | $E(\times 10^5)$ |
| o | 2.240921 | 0.96763930 | 6.4019860 | 17.70363 | 7.878938 |
| e | 2.126019 | 0.85784088 | 8.3393628 | 6.356423 | 8.103504 |

What is claimed is:

1. A system for line narrowing the output of an optical parametric oscillator, comprising:
   a nonlinear electro-optic medium,
   means for applying to said electro-optic medium a first electrical energy level to provide a first optical parametric oscillator gain profile,
   means for applying to said electro-optic medium energized by said first electrical energy level a single pump pulse having a corresponding single pump pulse duration, and
   means for applying to said electro-optic medium a second electrical energy level, differing from the level of said first electrical energy level, to provide a second optical parametric oscillator gain profile during said single pump pulse duration whereby said optical parametric oscillator is provided with differing gain profiles during said single pump pulse duration.

2. The system of claim 1, wherein said electro-optic medium is adapted to provide output frequences including only those frequencies present both in said first gain profile and in said second gain profile.

3. The system of claim 1, wherein said second electrical energy level is applied in the middle of said single pump pulse duration.

4. The system of claim 1, wherein said second electrical energy level is applied at a time offset from the middle of said single pump pulse duration.

5. The system of claim 1, wherein applying said single pump pulse produces a signal output in the infrared range.

6. The system of claim 1, wherein applying said single pump pulse produces a signal output in the visible range.

7. The system of claim 1, wherein applying said single pump pulse produces a signal output in the ultraviolet range.

8. The system of claim 1, wherein said single pump pulse duration is greater than approximately one nanosecond.

9. The system of claim 1, wherein said means for providing said electrical energy levels is a high voltage source.

10. A system for line narrowing the output of an optical parametric oscillator, comprising:
    a nonlinear electro-optic medium, means for applying to said electro-optic medium a first electrical energy level to provide a first optical parametric oscillator gain profile, means for applying to said electro-optic medium energized by said first electrical energy level a train of synchronous mode-locked pump pulses having a corresponding single synchronous mode-locked pulse train envelop duration, and means for applying to said electro-optic medium a second electrical energy level, differing from the level of said first electrical energy level, to provide a second optical parametric oscillator gain profile during said single synchronous mode-locked pulse train envelop duration whereby said optical parametric oscillator is provided with differing gain profiles during said single synchronous mode-locked pulse train envelop duration.

11. The system of claim 10, wherein said electro-optic medium is adopted to provide output frequencies including only those frequencies present both in said first gain profile and in said second gain profile.

12. The system of claim 10, wherein said second electrical energy level is applied in the middle of said single synchronous mode-locked pulse train envelop duration.

13. The system of claim 10, wherein said second electrical energy level is applied at a time offset from the middle of said single synchronous mode-locked pulse train envelop duration.

14. The system of claim 10, wherein applying said train of synchronous mode-locked pump pulses produces a signal output in the infrared range.

15. The system of claim 10, wherein applying said train of synchronous pump pulses a produces a signal output in the visible range.

16. The system of claim 10, wherein applying said train of synchronous mode-locked pump pulses produces a signal output in the ultraviolet range.

17. The system of claim 10, wherein said single synchronous pulse train envelop duration is greater than approximately one nanosecond.

18. The system of claim 10, wherein said means for providing said electrical energy levels is a high voltage source.

* * * * *